(12) United States Patent
Blomstedt

(10) Patent No.: US 11,281,010 B2
(45) Date of Patent: Mar. 22, 2022

(54) CURVED STAIRCASE WAVEGUIDE ELEMENT, PERSONAL DISPLAY DEVICE AND METHOD OF PRODUCING AN IMAGE

(71) Applicant: DISPELIX OY, Espoo (FI)

(72) Inventor: Kasimir Blomstedt, Espoo (FI)

(73) Assignee: DISPELIX OY, Espoo (FI)

( * ) Notice: Subject to any disclaimer, the term of this patent is extended or adjusted under 35 U.S.C. 154(b) by 0 days.

(21) Appl. No.: 16/954,962

(22) PCT Filed: Dec. 20, 2018

(86) PCT No.: PCT/FI2018/050957
§ 371 (c)(1),
(2) Date: Jun. 17, 2020

(87) PCT Pub. No.: WO2019/122527
PCT Pub. Date: Jun. 27, 2019

(65) Prior Publication Data
US 2020/0379260 A1    Dec. 3, 2020

(30) Foreign Application Priority Data
Dec. 22, 2017 (FI) .................................. 20176155

(51) Int. Cl.
*G02B 27/01* (2006.01)
*F21V 8/00* (2006.01)

(52) U.S. Cl.
CPC ....... *G02B 27/0172* (2013.01); *G02B 6/0016* (2013.01); *G02B 6/0035* (2013.01);
(Continued)

(58) Field of Classification Search
CPC ............ G02B 27/0172; G02B 27/4272; G02B 27/4205; G02B 27/0081; G02B 6/0016;
(Continued)

(56) References Cited

U.S. PATENT DOCUMENTS

| | | | |
|---|---|---|---|
| 6,791,736 B2* | 9/2004 | Jain ....................... | G02B 5/284 359/260 |
| 7,546,012 B2* | 6/2009 | Bratkovski .......... | G02B 6/4206 385/15 |

(Continued)

FOREIGN PATENT DOCUMENTS

| | | |
|---|---|---|
| CN | 104380157 A | 2/2015 |
| CN | 104536136 A | 4/2015 |

(Continued)

OTHER PUBLICATIONS

Reference number list for U.S. Patent Application Publication No. 2017/0003504 of Vallius et al. (Vallius) (Year: 2021).*

(Continued)

*Primary Examiner* — Andrew Jordan
(74) *Attorney, Agent, or Firm* — Maschoff Brennan

(57) ABSTRACT

The invention provides a diffractive waveguide element, waveguide stack, personal display and method of forming a viewable image. The element comprises a waveguide region defined by two optical surfaces between which light can propagate by total internal reflections, the optical surfaces having surface profiles, and at least one diffractive grating capable of modifying the light filed within the waveguide region. According to the invention, the surface profile of at least one of said optical surfaces is a staircase profile.

27 Claims, 6 Drawing Sheets

(52) U.S. Cl.
CPC ......... *G02B 6/0048* (2013.01); *G02B 6/0076* (2013.01); *G02B 2027/0123* (2013.01)

(58) Field of Classification Search
CPC .. G02B 6/0035; G02B 6/0048; G02B 6/0076; G02B 6/00; G02B 2027/0123; G02B 2027/0178; G02B 5/1828; G02B 5/18
See application file for complete search history.

(56) References Cited

U.S. PATENT DOCUMENTS

| | | | |
|---|---|---|---|
| 7,800,827 B2 | 9/2010 | Moliton et al. | |
| 8,810,913 B2* | 8/2014 | Simmonds | G02B 27/0172 359/631 |
| 8,830,584 B2 | 9/2014 | Saarikko | |
| 9,213,178 B1 | 12/2015 | Giri et al. | |
| 9,436,015 B2* | 9/2016 | Woodgate | H04N 13/32 |
| 9,594,261 B2* | 3/2017 | Woodgate | G02B 27/02 |
| 9,733,475 B1* | 8/2017 | Brown | G02B 27/0101 |
| 9,910,207 B2* | 3/2018 | Robinson | G02B 6/0056 |
| 9,910,276 B2* | 3/2018 | Vallius | G02B 5/1819 |
| 9,939,628 B2* | 4/2018 | Basset | G02B 6/0016 |
| 10,048,500 B2* | 8/2018 | Woodgate | G02B 27/0172 |
| 10,073,278 B2* | 9/2018 | Vallius | G02B 27/0081 |
| 10,175,418 B2* | 1/2019 | Robinson | G02B 30/24 |
| 10,228,505 B2* | 3/2019 | Robinson | G02B 6/0091 |
| 10,330,843 B2* | 6/2019 | Robinson | G02B 5/09 |
| 10,359,560 B2* | 7/2019 | Robinson | G02B 6/0038 |
| 10,359,561 B2* | 7/2019 | Woodgate | G02B 6/0068 |
| 10,365,426 B2* | 7/2019 | Woodgate | G02B 6/0078 |
| 10,401,638 B2* | 9/2019 | Robinson | G02B 30/26 |
| 10,459,152 B2* | 10/2019 | Robinson | G02B 6/0038 |
| 10,656,421 B2 | 5/2020 | Piskunov et al. | |
| 11,054,651 B2 | 7/2021 | Dobschal et al. | |
| 2002/0191299 A1* | 12/2002 | Jain | G02B 6/29358 359/637 |
| 2009/0103862 A1* | 4/2009 | Bratkovski | G02B 6/4206 385/31 |
| 2010/0134534 A1* | 6/2010 | Seesselberg | G02B 27/0081 345/690 |
| 2010/0277803 A1* | 11/2010 | Pockett | G02B 27/4205 359/567 |
| 2010/0315719 A1* | 12/2010 | Saarikko | G02B 27/0101 359/630 |
| 2010/0321781 A1* | 12/2010 | Levola | G02B 27/4205 359/569 |
| 2012/0300311 A1* | 11/2012 | Simmonds | G02B 27/0081 359/630 |
| 2013/0307831 A1* | 11/2013 | Robinson | G02B 6/0048 345/207 |
| 2013/0308185 A1* | 11/2013 | Robinson | G02B 6/0048 359/465 |
| 2013/0308339 A1* | 11/2013 | Woodgate | G02F 1/133524 362/609 |
| 2013/0328866 A1* | 12/2013 | Woodgate | G02B 6/005 345/419 |
| 2013/0335821 A1* | 12/2013 | Robinson | G02B 6/0068 359/464 |
| 2014/0036361 A1* | 2/2014 | Woodgate | G02B 6/0061 359/466 |
| 2014/0177032 A1* | 6/2014 | Woodgate | H04N 13/366 359/298 |
| 2016/0131823 A1* | 5/2016 | Woodgate | G02B 6/0055 362/612 |
| 2016/0209576 A1* | 7/2016 | Robinson | F21V 13/12 |
| 2016/0299281 A1* | 10/2016 | Robinson | G02B 5/09 |
| 2016/0306099 A1* | 10/2016 | Robinson | G02B 5/09 |
| 2016/0334635 A1* | 11/2016 | Ushigome | G02B 27/4272 |
| 2016/0349444 A1* | 12/2016 | Robinson | G02B 6/0091 |
| 2017/0003504 A1* | 1/2017 | Vallius | G02B 27/0172 |
| 2017/0045745 A1 | 2/2017 | Piskunov et al. | |
| 2017/0059879 A1* | 3/2017 | Vallius | G02B 27/0081 |
| 2017/0139097 A1* | 5/2017 | Robinson | G02B 30/26 |
| 2017/0139110 A1 | 5/2017 | Woodgate | |
| 2017/0139114 A1* | 5/2017 | Woodgate | H04N 13/302 |
| 2017/0205618 A1* | 7/2017 | Basset | G02B 6/0036 |
| 2017/0235040 A1* | 8/2017 | Robinson | G09G 5/14 348/54 |
| 2017/0242191 A1* | 8/2017 | Rhee | G02B 6/124 |
| 2017/0336661 A1* | 11/2017 | Harrold | G02B 6/0048 |
| 2017/0339398 A1* | 11/2017 | Woodgate | G02B 30/24 |
| 2017/0357089 A1 | 12/2017 | Tervo | |
| 2017/0363870 A1 | 12/2017 | Cakmakci et al. | |
| 2018/0196275 A1* | 7/2018 | Robinson | G02B 30/27 |
| 2019/0179076 A9* | 6/2019 | Woodgate | G02B 6/0068 |
| 2020/0049870 A1* | 2/2020 | Kubo | G02B 5/1838 |
| 2020/0096694 A1* | 3/2020 | Robinson | G02B 5/09 |
| 2020/0333614 A1* | 10/2020 | Blomstedt | G02B 5/1828 |
| 2020/0379260 A1* | 12/2020 | Blomstedt | G02B 27/4272 |
| 2021/0015604 A1* | 1/2021 | Ma | G02C 7/022 |
| 2021/0063638 A1* | 3/2021 | Baets | G01J 3/1895 |

FOREIGN PATENT DOCUMENTS

| | | |
|---|---|---|
| CN | 105259605 A | 1/2016 |
| DE | 102014118490 A1 | 6/2016 |
| DE | 102016109288 A1 | 11/2017 |
| WO | 2016010289 A1 | 1/2016 |
| WO | 2016091743 A1 | 6/2016 |
| WO | 2017003674 A1 | 1/2017 |
| WO | 2017034765 A1 | 3/2017 |
| WO | 2017148232 A1 | 9/2017 |

OTHER PUBLICATIONS

Reference number list for U.S. Patent Application Publication No. 2017/0139110 of Woodgate et al. (Woodgate) (Year: 2021).*
Reference number list for U.S. Patent Application Publication No. 2010/0321781 of Levola et al. (Levola) (Year: 2021).*
Reference number list for U.S. Patent Application Publication No. 2009/0103862 of Bratkovski et al. (Bratkovski) (Year: 2021).*
Reference number list for U.S. Patent Application Publication No. 2020/0379260 of Blomstedt (Blomstedt, the present application) (Year: 2021).*
Finnish Search Report dated Jul. 3, 2018 as received in application No. 20176155.
Chinese Office Action dated Jul. 23, 2021 as received in application No. 201880082120.7.
European Search Report dated Jun. 18, 2021 as received in application No. 18890572.3.

* cited by examiner

CURVED STAIRCASE WAVEGUIDE ELEMENT, PERSONAL DISPLAY DEVICE AND METHOD OF PRODUCING AN IMAGE

FIELD OF THE INVENTION

The invention relates to optical waveguides. In particular, the invention relates to non-flat waveguides having a diffractive grating provided thereon. Such waveguides can be used in augmented reality (AR), virtual reality (VR) and mixed reality (MR) devices and applications, like in near-to-the-eye displays (NEDs).

BACKGROUND OF THE INVENTION

In augmented reality near-to-the-eye devices, a viewable image can be produced by a waveguide that is placed in front of one or both eyes of the user. The shape of the waveguide is restricted by the physical requirements placed on the waveguide function, but often this shape, which can be e.g. planar or spherical, is not acceptable from a form-factor or appearance point of view.

U.S. Pat. No. 8,830,584 B2 discloses state-of-the-art spherical and aspherical waveguides. In particular, it discusses an apparatus and method for using exit pupil expanders (EPE) with spherical or aspheric non-flat substrates and a plurality of diffractive elements for expanding the exit pupil of a display for viewing in order to reduce image spreading, improve image resolution and allowing utilization of shorter focus distances. Similar solutions are discussed also in P. Saarikko, J. Opt. A: Pure Appl. Opt. 11 (2009), 065504.

Using prior art waveguide solutions, the optical properties and performance of the waveguide are tightly tied with its physical shape. Therefore, one needs to make a compromise between physical and visual design factors. For example, it is difficult to integrate diffractive waveguide displays with existing optical elements, such as corrective or non-corrective lenses. Such integration would, however, be desirable in order to make for example display devices having so-called spectacle form-factor, which is common in particular in AR NEDs.

Thus, there is a need for improved waveguides and waveguide-based display devices.

SUMMARY OF THE INVENTION

It is an aim of the invention to solve at least some of the abovementioned problems and to provide a novel waveguide element in particular for personal display applications. A specific aim is to provide a solution that can be used to decouple the shape of the waveguide from the shape of the surface it has to follow, so that both the physical and the visual requirements can be satisfied simultaneously, i.e. to provide a solution offering more freedoms of waveguide design.

A particular aim is also to provide a personal display, such as a near-to-the-eye device, in a spectacle form-factor.

The aims are achieved by the invention according to the independent claims.

According to one aspect, the invention provides a diffractive waveguide element which comprises a waveguide region defined by two optical surfaces between which light can propagate by total internal reflections, the optical surfaces having surface profiles, and at least one diffractive optical element (DOE), in particular a grating, capable of modifying the light field within the waveguide region. According to the invention, the surface profile of at least one of the optical surfaces is a staircase profile.

According to another aspect, the invention provides a waveguide stack comprising a plurality of similar or non-similar waveguide elements of the above kind superimposed on top of each other.

According to a further aspect, the invention provides a personal display device comprising a waveguide element or waveguide stack of the present kind and an image projector adapted to project an image to the waveguide element or waveguide stack for propagation with the waveguide region. The grating can serve as an in-coupling grating, out-coupling grating, exit pupil expander grating.

According to one aspect, the invention provides a method of forming a viewable image in a near-to-the-eye display, the method comprising providing a waveguide element or waveguide stack as discussed above, projecting an image to an in-coupling grating arranged on a first region of the waveguide element or waveguide stack, allowing light to propagate inside the waveguide region or region along the staircase profile, and coupling light out of the waveguide by an out-coupling grating arranged on a second region of the waveguide element or waveguide stack.

The invention offers significant benefits. First, the staircase geometry discussed herein can be used to implement waveguide elements that follow predefined non-flat surface shapes such that the geometry of the actual waveguide region differs from the geometry of the surface that the waveguide element follows. Thus, the present waveguide geometry is decoupled from the geometry of the bounding outer surfaces, and thus the outer surfaces can, in principle, be completely arbitrary. This is in contrast to conventional curved waveguides, which can only match outer surfaces with the same form.

Put simply, a staircase profile can for example be used to implement a waveguide-based display element on a curved substrate, the element having the optical properties of a planar element, most notably the image appearing to reside in the infinity. Thus, one can make "optically planar" but physically non-planar display elements. Likewise, display elements with predefined curved waveguide shapes and therefore apparently finite image distance can be implemented irrespective of the shape of the substrate. Thus, one can make "optically non-planar" and physically planar or non-planar display elements. Examples of some of these variations are given later in this document.

To mention one example, a staircase waveguide can be made to follow two non-concentric spherical surfaces, which is impossible for conventional spherical waveguides, which require the two surfaces to be concentric. On the other hand, for planar waveguides, the waveguide function remains unaffected if a flat waveguide is replaced by a staircase waveguide.

The transition from an ordinary (vanilla) planar or spherical waveguide to the staircase form does not alter the fundamentals of the waveguide geometry (for planar waveguides and to zeroth-order for spherical waveguides). Therefore, established design methodologies can successfully be applied for the design of staircase waveguides and diffracting gratings atop of them.

The present waveguide element can be used in AR, VR and MR near-to-the-eye applications, such as NEDs where, in particular, the spectacle form factor calls for waveguide elements that fit snugly onto the front side of the lenses. It can be used in particular in see-through displays, and notably also in connection with lens optics, including corrective lenses. The staircase geometry can be applied to both planar and spherical waveguides, that is, waveguides that provide images with focal distances at infinity or at some finite distance, respectively.

Because the staircase waveguide can follow arbitrary surface shapes, visual requirements can be used to determine the form of the waveguide without detrimentally affecting the realizability of optical functions. Specifically, the staircase waveguide elements can be used to match the spectacle form-factor, where the visual appeal calls for placing the element snugly along the outer surface of the spectacle lens. Indeed, one aspect of the invention comprise a near-to-the-eye display device in a spectacle form-factor, where a waveguide element is added atop of a corrective or non-corrective lens and where the general shape of the element matches with the shape of the lens in at least one region. Similarly, the staircase waveguide element may be designed to match in shape with any other external surface.

Staircase waveguide elements are also stackable, which means that a stack of a plurality of individual staircase waveguides with the same of different curvatures of the optical surfaces can be implemented. Different curvatures of the waveguides allow for realization of a multi-focal-plane element, which allows for implementing VR, AR and MR devices with novel kinds of optical features and improved user experience.

The dependent claims are directed to selected embodiments of the invention.

In some embodiments, both of the two optical surfaces defining the waveguide have staircase profiles. By making the staircase profiles essentially correspond to each other, one can produce "piecewise constant-thickness" waveguide regions have desired optical properties irrespective of the physical shape of the waveguide element.

In some embodiments, the waveguide region has a generally curved shape, such as a spherical or aspherical shape, wherein the generally curved shape is defined by discrete steps of the staircase profile.

In some embodiments, the staircase profile comprises a plurality of principal surfaces at which said total internal reflections occur. In further embodiments, there are intermediate surfaces between pairs of principal surfaces. In alternative embodiments, there are no optically significant intermediate surfaces, i.e., the riser of the stairs is implicitly defined by the principal surfaces.

In some embodiments, at least some, or all, of the principal surfaces are planar. Thus, for these parts the waveguide element appears optically as a planar waveguide. In some embodiments, at least some, or all, of the principal surfaces are curved, such as spherical or aspherical.

In some embodiments, the waveguide region has a generally curved shape and the principal surfaces have curvature in the opposite direction than the curvature of the generally curved shape. In alternative embodiments, the principal surfaces have curvature in the same direction as the curvature of said generally curved shape.

In some embodiments, the principal surfaces are shaped as parts of a continuous surface, such as a spherical surface or lens surface having a focal distance. That is, if the risers of the stairs would be removed, and the principal surfaces translated accordingly next to each other, a continuous and smooth surface would appear.

In some embodiments, intermediate surfaces have a lower transmittance than the principal surfaces. By decreasing the opacity of the intermediate surfaces, disturbances caused by them can be reduced.

In some embodiments, in the intermediate surfaces are at essentially right angles with respect to the neighboring principal surfaces. Alternatively, by arranging at least most of the intermediate surfaces are at slanted angles with respect to the neighboring principal surfaces, one can also reduce disturbances caused by the intermediate surfaces.

In some embodiments, the intermediate surfaces are parallel to each other.

In some embodiments, the optical surface or surfaces having the staircase profile forms at least part of the outer surface of the waveguide element. In some embodiments, the optical surface or surfaces having the staircase profile are at least partly separated from the outer surface of the element by a layer of material. The material can be the same or different from the material of the waveguide region itself. If the material is the same, the presence of intermediate surfaces, which may decrease the optical performance of the element, can be avoided. The outer surface profile of the waveguide element is typically continuous, i.e. smooth, for example planar or spherical.

The staircase-profiled optical surfaces of the waveguide region may be defined by the interface between the waveguide and an air or vacuum hollow layer or a low-refractive index solid material layer.

In some embodiments, the diffractive optical element contained in the waveguide element comprises
 an in-coupling grating for coupling light rays directed thereto from outside of the waveguide region into the waveguide region,
 an out-coupling grating for coupling light rays travelling inside the waveguide region outside of the waveguide, or
 an exit pupil expander grating for extending the exit pupil of light travelling within the waveguide region.

There may be also several gratings from one or more of these groups or any single grating in the element may serve for two or more of these functions.

In some embodiments, the waveguide element is made from transparent material and is adapted to allow light to pass the waveguide element essentially transversely to the propagation direction of light in the waveguide region. This allows the use of the element in see-through displays, such as HMD and HUD displays in AR applications, for example.

In some embodiments, the present personal display device comprises at least two diffractive gratings one of which is an in-coupling grating positioned at a first region of the waveguide element and one of which is an out-coupling grating positioned at a second region of the waveguide element, and wherein the image projector is adapted to project the image on the in-coupling grating for coupling to the waveguide region, and the out-coupling grating is adapted to couple the image out of the waveguide region to a viewer's eye at a distance from the waveguide element.

In some embodiments, the waveguide element is shaped as a curved corrective or non-corrective lens or placed on top of a curved corrective or non-corrective lens following its shape.

In some embodiments, the present waveguide element or waveguide stack comprising such element is provided in the spectacle form factor, making it particularly suitable for wearable display devices, like smart glasses.

Next, embodiments of the invention and advantages thereof are discussed in more details with reference to the attached drawings.

DETAILED DESCRIPTION OF EMBODIMENTS

Definitions

Figure 1:
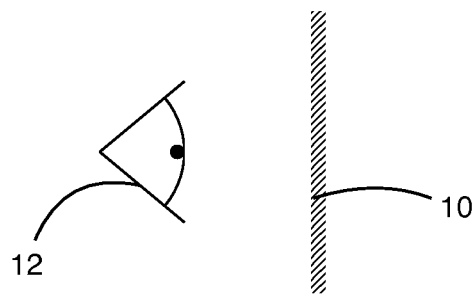
FIG. 1 illustrates a NED placed in front of an eye.

"Waveguide region", or briefly "waveguide" herein refers to a structure capable of guiding within the structure optical wavelengths, in particular visible optical wavelengths, via total internal reflections.

"Waveguide element" refers to an entity comprising at least one waveguide region. The waveguide region may be composed of several separate waveguide layers on top of each other. The element may, however, comprise also other parts, such as one or more material layers on the surface(s) of the waveguide region and/or one or more gratings.

"Optical surface" refers to a refractive interface at the border or within the waveguide element.

"Surface profile" means the geometric shape of a surface, when inspected in a cross-sectional plane thereof. It should be noted that discussions of the shape of the various possible surface profiles herein, unless otherwise mentioned or apparent, are made with respect to a cross-sectional plane. However, in practice, the waveguide and optical surfaces thereof may have three-dimensional shapes with a dimension and curvature transverse to this plane.

"Staircase profile" means a surface profile with a plurality of discrete (abrupt) height changes. The profile has a plurality of distinguishable sub-surfaces at an angle with respect to neighboring sub-surfaces in at least one cross-sectional plane, thus forming a plurality of steps resembling the form of a staircase. In particular, every second sub-surface (principal surface) can be parallel or approximately parallel with is neighboring every second sub-surface. The dimensions of the steps in the general plane of the waveguide by are larger than the optical diffractive limit so that the profile itself does not cause significant diffraction of light but rather guide the light according to a desired geometric scheme with high efficiency.

"Continuous profile" refers to a profile without discrete height changes, i.e., a smooth, non-staircase profile.

"Staircase waveguide" refers to a waveguide region defined by at least one optical surface with a staircase profile. "Vanilla waveguide", refers to a conventional waveguide with only continuous optical surfaces contributing to light propagation.

"General plane/shape of the waveguide" refers to the macroscopic plane/shape of the waveguide, thus disregarding the discrete height variations, which do not significantly affect the overall propagation direction of light therein. The general shape of the waveguide is thus defined by smooth curves fitted through outer corners of the steps of the staircase profiles such that the whole waveguide region remains within the curves.

"Non-flat" covers all other shapes than entirely planar, i.e. "pancake" shapes. In particular, spherical and aspherical curved shapes are covered. It should be noted that the general shape of the waveguide discussed herein is generally non-flat, whereas the sub-surfaces of the staircase profiles may be either flat or non-flat. That is, a non-flat waveguide shape can be defined by either flat or non-flat optical surfaces, i.e. flat or non-flat stairs.

"Principal surface" refers to a sub-surface of a staircase-profiled surface that contributes to guiding the light rays along the general plane of the waveguide through total internal reflections (that is, the tread of a stair, following traditional staircase terminology) and/or via interaction with a diffractive optical element (DOE), such as grating located at the sub-surface. "Intermediate surface" refers to a sub-surface between two principal surfaces, therefore contributing to the formation of the stairs (that is, the riser of the stair). The intermediate surfaces are generally at a right or oblique angle with respect to the principal surfaces, each of the intermediate surfaces connecting two, or in more complex geometries even more, principal surfaces.

"Planar waveguide" refers to a waveguide were all principal surfaces (treads of the staircase) are planar, i.e. flat. "Curved waveguide" refers to a waveguide where some or all principal surfaces are curved, such as spherical or aspherical.

"Outer surface" refers to a boundary surface of the waveguide element. The outer surface can be formed of the staircase surface, whereby it follows the general shape of the waveguide, or another surface of material provided on top of the staircase surface. Therefore, the outer surface of the waveguide element may or may not follow the general shape of the waveguide region.

"External surface" refers to a surface of another entity the waveguide can be placed on, such as the surface of a lens.

Modifying the light field within the waveguide by a grating means in particular in-coupling light into the waveguide, out-coupling light from the waveguide or otherwise modifying the properties of the light field, such as e.g. extending the exit pupil of the waveguide.

Description of Selected Embodiments

Referring to FIG. 1, in near-to-the-eye devices for augmented reality applications an image superimposed on the normal view of the eye 12 is produced by a device 10 placed in proximity to the eye 12, typically a few cm from the eye 12 itself. The configuration can be such that the device provides an image for one or for two eyes, but two-eye functionality can also be achieved by using two separate devices, one for each eye. Here the invention is described from the one-eye or each-eye-separately perspective, but it is equally well applicable in the two-eye setting.

Figure 2:
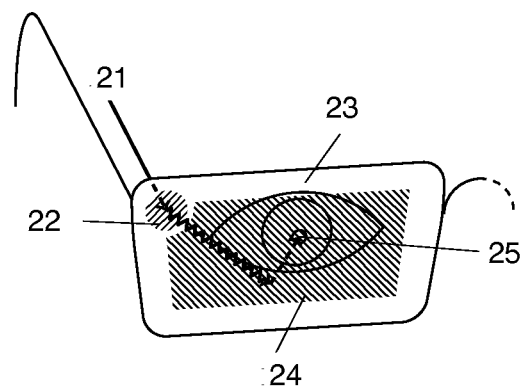
FIG. 2 illustrates a NED having a so-called spectacle form factor.

Referring to FIG. 2, one possible form factor for near-to-the-eye devices is the 'spectacle' form factor, where the near-to-the-eye devices replace (no visual correction) or sit on top of (visual correction) the spectacle lens. In such a configuration the image is produced for example in the spectacle frame by a projector or other display device as an image beam 21, which illuminates the in-coupling area 22 of the waveguide. From there the light-field is carried by the waveguide 23 to and within the beam expansion and out-coupling areas 24. From the light-field emitted by the latter illuminates the pupil 25 of the observer's eye. The illustrated one is only one specific example of such a device, with many different variations and configurations possible. The present invention and the following description focuses in particular on geometrical shape (surface form) of the waveguide 23.

Figure 3:
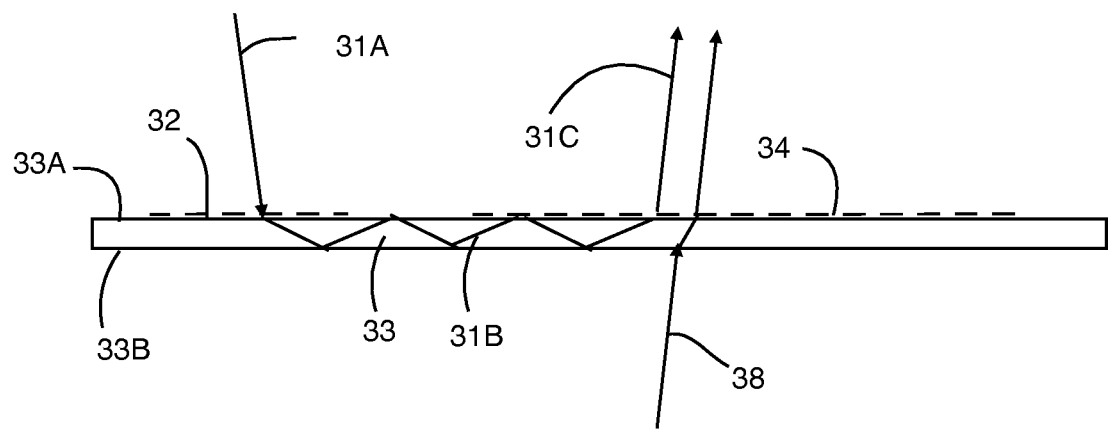
FIG. 3 shows a general waveguide structure usable in NEDs.

FIG. 3 shows in a cross-sectional plane a typical planar waveguide structure. The waveguide 33 comprises two principal surfaces 33A, 33B, at which total internal reflection occurs and a waveguide proper, where wave propagation takes place. Here we illustrate the principal surfaces as being planar, but generally the present invention is equally applicable to waveguides with curved surfaces, in particular sections of spherical surfaces.

One or both of the principal surfaces 33A, 33B can be fully or partially covered by a diffractive structure, which can modify the light-field inside the waveguide proper. The diffractive structure can serve as an in-coupling grating 32 or an out-coupling grating 34, as illustrated in FIG. 3, or an exit pupil extension grating (not shown). The in-coupling grating 32 couples light 31A directed from outside of the waveguide 33 into the waveguide 33. The in-coupled light 31B propagates in the waveguide until it hits and is coupled out as out-coupled light 31C by the out-coupling grating 34. In the case of see-through displays, like in AR applications, light 38 from the environment is allowed (apart from the in-coupling region, where maximum coupling efficiency is desired) to pass through the structure with minimal distortion.

The waveguide proper is typically of constant refractive index, but within the scope of the invention other waveguide structures can also be considered, such as gradient-index profiles and stacks of constant-index materials interspaced with diffractive gratings, or even stacks of waveguide propers.

Next, different embodiments of staircase waveguide elements are described with reference to FIGS. 4-15.

Figure 4:
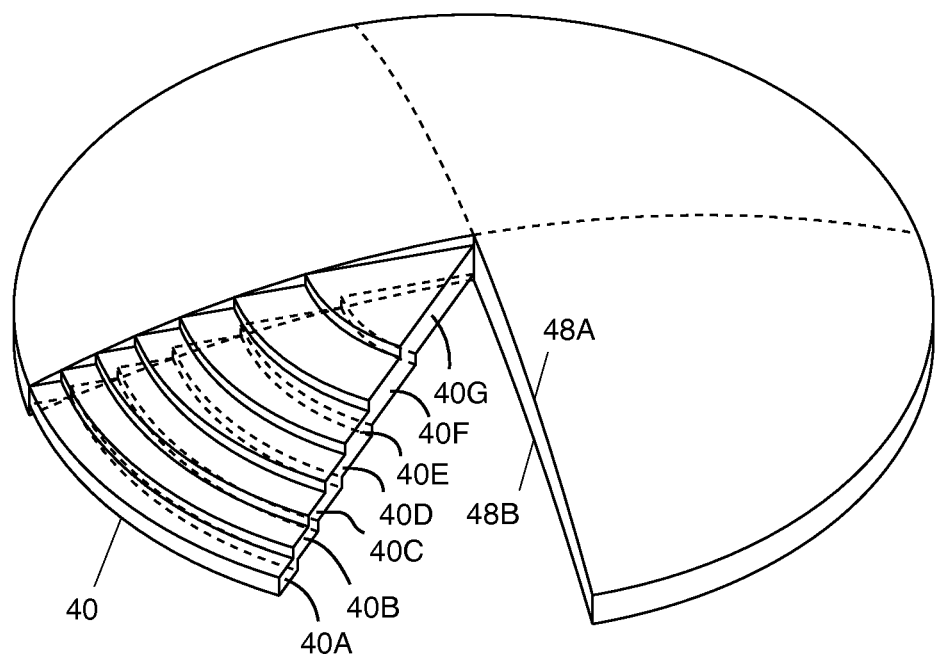
FIG. 4 shows in perspective view a staircase waveguide element according to one embodiment.

FIG. 4 illustrates one possible waveguide 40. The waveguide 40 is adapted to fit between two pre-defined surfaces 48A, 48B (i.e. within a pre-defined general waveguide shape) so that it implements an optical function of a pre-defined near-to-the-eye display. This is accomplished in accordance with the invention by providing the waveguide with staircase surface profile. Herein, both surfaces of the waveguide have a staircase form so that positions of the edges of the stairs 40A-G follow the shape of the pre-defined boundary surfaces 48A, 48B on both sides of the waveguide 40.

The boundary surfaces 48A, 48B may either be actual surfaces or only virtual design criteria, as will be discussed later in more detail. In the former case, the light-field from the waveguide will pass one of these surfaces before entering the eye and the optical power of this surface can be compensated for in the design.

There are no fundamental restrictions on the geometry of the boundary surfaces as long as the space between them can be sectioned by surface profiles having a finite number of stairs into a physical structure, preferably into a unitary volume of waveguide material.

Figure 5:
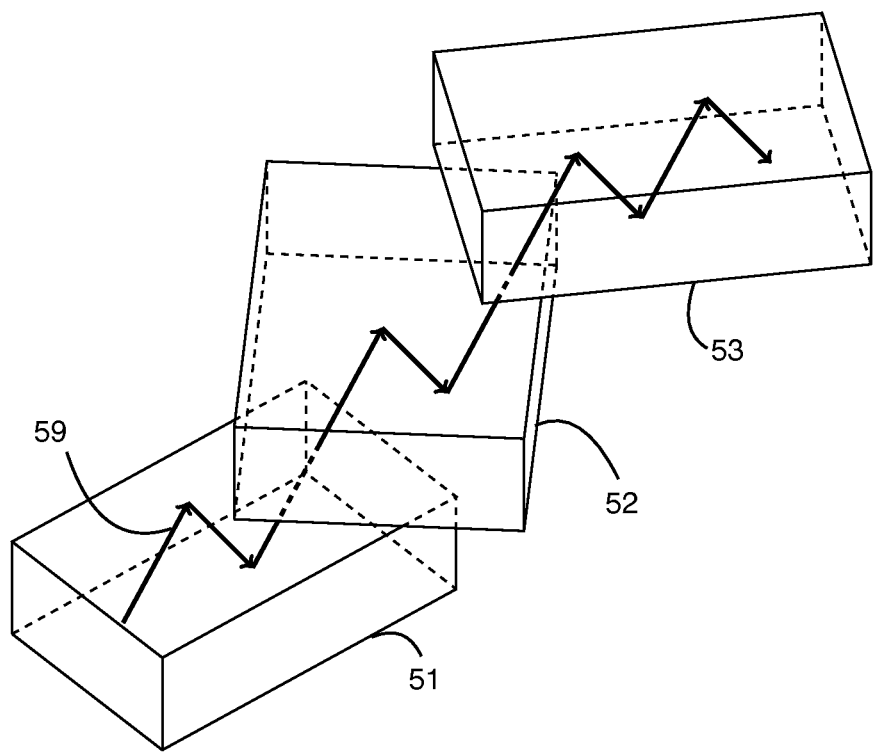
FIG. 5 illustrates in perspective view the propagation of light in a staircase waveguide.

FIG. 5 illustrates the propagation of waves 59 in a staircase waveguide in the case of planar (flat) stairs 51, 52, 53, i.e., stairs with planar principal surfaces. The stairs 51, 52, 53 can be thought as a stack of planar waveguides having the same index of refraction. Thus, no refraction takes place in their interface and the propagation direction in the plane of the principal surfaces remains unchanged. Indeed, the only difference to the functionality of a vanilla planar waveguide is that the distance between the locations of successive ray hits on one side of the waveguide (hop distance) is affected by the total thickness of the staircase waveguide at that point rather than being a constant of the (vanilla) waveguide thickness. Apart from this change, the basic functionality of staircase waveguides does not differ from the functionality of vanilla waveguides, even for staircase waveguides, where the thickness of the waveguide is different for the different 'steps'.

Because the hop distance can be accounted for when designing/optimizing the diffractive structures atop the waveguide, it follows that all design methodologies that are applicable for planar waveguides can directly be applied for staircase waveguides as well. Since such methodologies are typically nontrivial and rely strongly on the planar geometry, the staircase-approach thus provides a convenient and straightforward way of extending the usability of these methods to waveguides that follow pre-determined outer surfaces (see FIG. 4).

Figure 6:
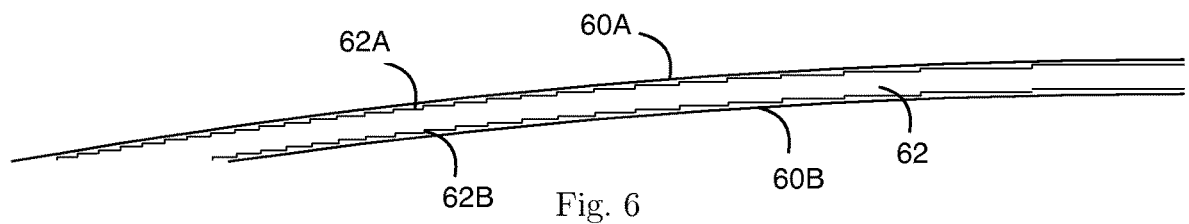
FIGS. 6-11 illustrate in cross-sectional views different variations of waveguide elements having staircase surface profiles.
Figure 7:
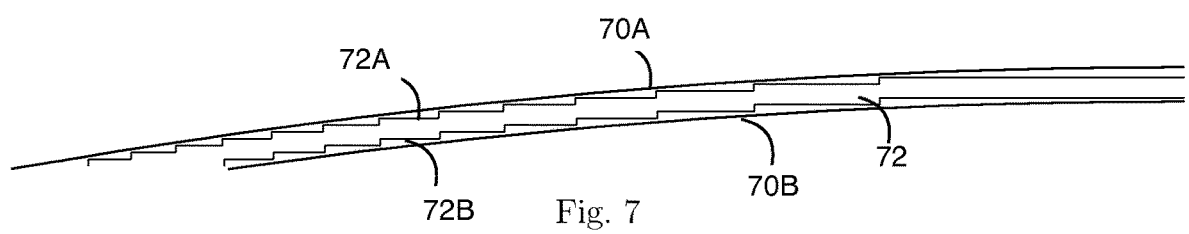
Figure 8:
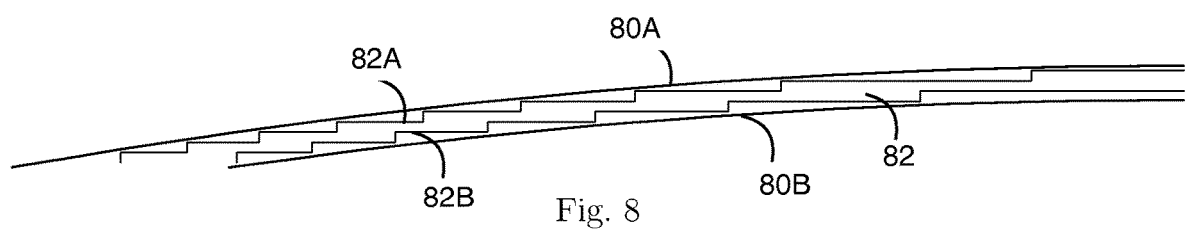

Additional examples of planar-stair staircase waveguides 62, 72, 82 are shown in FIGS. 6-8, which illustrate that different step-sizes can be used to produce staircase waveguides that follow the same pre-determined surfaces 60A, 60B, i.e. implement the same general waveguide shape, but are otherwise distinct. For convenience, only planar cross-sections of waveguide structures are shown, a convention which we will follow henceforth without it implying any restrictions on the scope of the invention. In FIGS. 6 and 7, the first and second surface profiles 62A, 62B; 72A, 72B have stairs (intermediate surfaces) aligned with each other in the horizontal direction. The stair height in FIG. 6 is smaller than in FIG. 7. In FIG. 8, the stairs in the first and second surfaces 82A, 82B are interleaved, i.e. non-aligned with each other. However, the resulting waveguide 82 implements the same general waveguide shape as the waveguides 62, 72 of FIGS. 6 and 7.

These presented principles not only apply to planar waveguides, but can also be directly applied to curved waveguides, such as spherical waveguides. A spherical waveguide, for example, comprises two concentric spherical surfaces (the principal surfaces of the waveguide) between which the rays of the light-field bounce. In such waveguides, the ray angle with respect to any specific spherical surface that is concentric to the principal surfaces is a constant of the propagation, that is, it is unchanged from one hop to the next. In fact, this angle does not change even if we replace one or both of the waveguide principal surfaces with another concentric spherical surface. Thus, in analogy to planar waveguides, spherical waveguides also support ray direction constancy when the principal surfaces are represented by a multitude of concentric spherical surfaces (the steps) with different radii of curvature.

Figure 9:
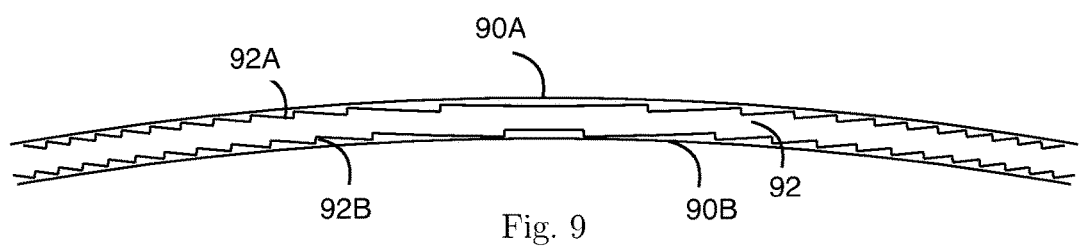
Figure 10:
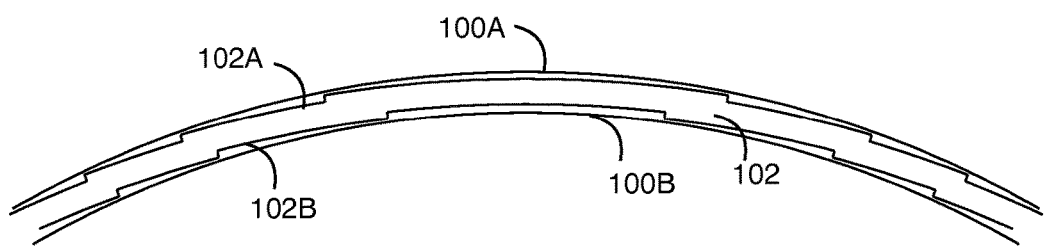
Figure 11:
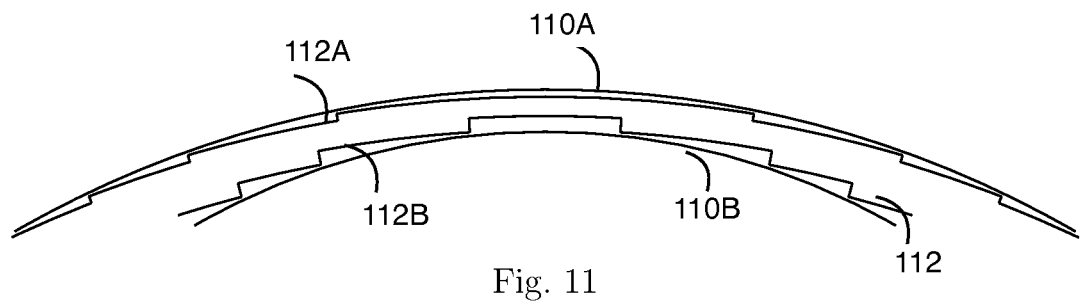

Examples of spherical staircase waveguides 92, 102, 112 are shown in FIGS. 9-11. In all cases, the first and second optical surfaces 92A, 92B; 102A, 102B; 112A, 112B define a waveguide 92: 102; 112 which has a curved general shape. In the case of FIG. 9, the principal surfaces are spherical with curvature in the opposite direction than the pre-determined surfaces 90A, 90B defining the general shape. In the case of FIG. 10, the curvatures between the principal surfaces and the pre-determined surfaces 100A, 100B are in the same direction (but not generally equal in magnitude). FIG. 11, illustrates a situation, where the curvatures of principal surfaces of the pre-determined surfaces 110A, 110B are different with respect to each other.

The same general shape can be implemented with smaller or larger stairs. In near-to-the-eye applications with moderately curved shapes, the tread of the stairs (principal surfaces dimension in the plane of FIGS. 6-12), can be e.g. 2-30 mm, for example 5-20 mm, and the riser of the stairs (intermediate surface direction in the plane of FIGS. 6-12) e.g. 50-1000 µm, for example 100-200 µm.

Figure 12:
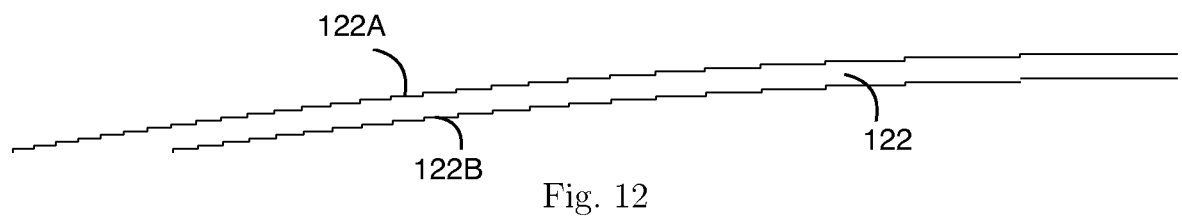
FIG. 12 illustrates a staircase waveguide element where the staircase surfaces form the outer surfaces of the element.

The complete system that comprises or consists of a combination of a staircase waveguide and the pre-determined surfaces it follows can take different realizations. The most straightforward embodiment is to simply realize the waveguide itself with the pre-determined surfaces providing only an implicit reference, i.e. are not present in the physical product. This is called herein a "type A" element or "naked" staircase waveguide and is illustrated in FIG. 12. Thus, the staircase surfaces form the outer surfaces of the waveguide. In this configuration, a planar (spherical) model of the waveguide structure provides an accurate (a zeroth-order) description of the workings of the actual waveguide. This is sufficient for many applications. Any of the staircase waveguide geometries illustrated in FIGS. 6-11 can be implemented as type A element.

In some embodiments, the pre-defined surfaces are explicitly present, i.e. implemented as actual outer optical surfaces, separate from the staircase surfaces, in the physical product. This is called herein a "type B" element and illustrated in FIGS. 6-11 and 15. When the optical powers of the pre-defined surfaces are sufficiently small or when they provide an effect that is desired or can be tolerated, they can simply be added to the staircase waveguide design. In "type B" elements, in order for total internal reflections to occur, the material layer between the waveguide 62, 72, 82, 92, 102, 112 and the outer surfaces 60A/B, 70A/B, 80A/B, 90A/B, 100A/B, 110A/B can be of significantly lower index of refraction material. Alternatively, or in addition to that, there may be provided an air or vacuum hollow at the location of the interface of the layers, which maximizes the difference between the indices of refraction and consequently the FOV of the element. In a still further embodiment, there is a thin low refractive index solid-material interface layer between the layers. With reference to FIGS. 6-11 and 15, the hollow or interface layer is positioned at the location of the principal surfaces 62A/B, 72A/B, 82A/B, 92A/B, 102A/B, 112A/B, 152A/B (and intermediate surfaces, if present) and not specifically drawn in the Figures.

In the case of hollow layers or low refractive index interface layers at the principal surfaces of the waveguide, the thickness of the hollow layer can be e.g. 10 µm or more, such as 10-100 µm, which is sufficient for defining the waveguide.

In some embodiments of the "type B" elements, the waveguide geometry must be changed to compensate for the added optical function of the separate outer surfaces. Such compensation can be achieved with non-planar principal surfaces of the waveguide, for example by replacing a planar waveguide by a spherical waveguide or by changing the curvature of a spherical waveguide, for example as illustrated in FIGS. 9-11. This specific case of the "type B" element having both non-planar principal surfaces and separate outer surfaces, is called a "type C" element.

As illustrated, the intermediate surfaces are typically shorter than the principal surfaces in the transverse cross-sectional plane of the waveguide. In one typical configuration, the principal surfaces are approximately parallel to the general plane of the waveguide at each location thereof, i.e., deviating not more than 20 degrees, usually not more than 10 degrees, from that plane. The intermediate surfaces may be at 30-150, such as 45-135, degrees angle, in particular 70-110 degrees angle, with respect to the neighboring principal surfaces.

In typical see-through near-to-the-eye display applications the optical system generating the image displayed to the eye should not disturb the light passing from the environment to the eye (FIG. 3: 38). In practice, such disturbances cannot be completely avoided, but they should be made as small as possible. For planar waveguides the reflections of the principal surfaces and the grating structures on these surfaces are the main sources of disturbance and these disturbances can be controlled reasonably well. Spherical waveguides additionally introduce a lensing effect due to the optical power of their principal surfaces. This effect is more difficult to compensate for, but it can usually be tolerated.

Figure 13:
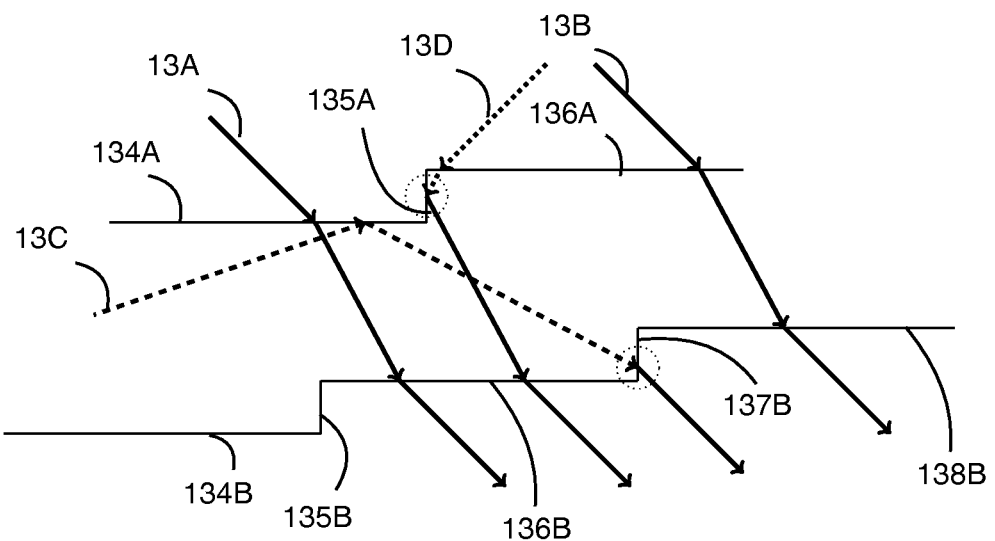
FIGS. 13 and 14 show in detail the propagation of light rays in a staircase waveguide having right angle intermediate surfaces and slanted intermediate surfaces, correspondingly.

As illustrated in FIG. 13, in naked staircase waveguides (type A element), the intermediate surfaces 135A, 135B, 137B of the waveguide structure provide a further source of disturbance to the light field. Indeed, light rays 13A, 13B, 13D passing through the waveguide or light rays 13C propagating inside the waveguide may be reflected by these surfaces 135A, 135B, 137B (undesired reflection and refraction points are circled in FIG. 13) and hence reach the eye at an incorrect angle or otherwise unintendedly.

In one embodiment, the intermediate surfaces 135A, 135B, 137B, despite the potential undesired reflections and/or refractions, have the same optical properties as the principal surfaces 134A, 134B, 136A, 136B, 138B. They can also be oriented normal to the principal surfaces in the cross-sectional plane, as illustrated in FIG. 13.

In an alternative embodiment, the intermediate surfaces 135A, 135B, 137B on either or both sides of the waveguide have been blackened, i.e., made non-transparent, so that no light reaches the eye from the corresponding directions. This removes the undesired reflections and/or refractions. In one embodiment, the intermediate surfaces 135A, 135B, 137B are partially blackened, whereby their transmittance can be e.g. 10-90% of that of the principal surfaces 134A, 134B, 136A, 136B, 138B.

Figure 14:
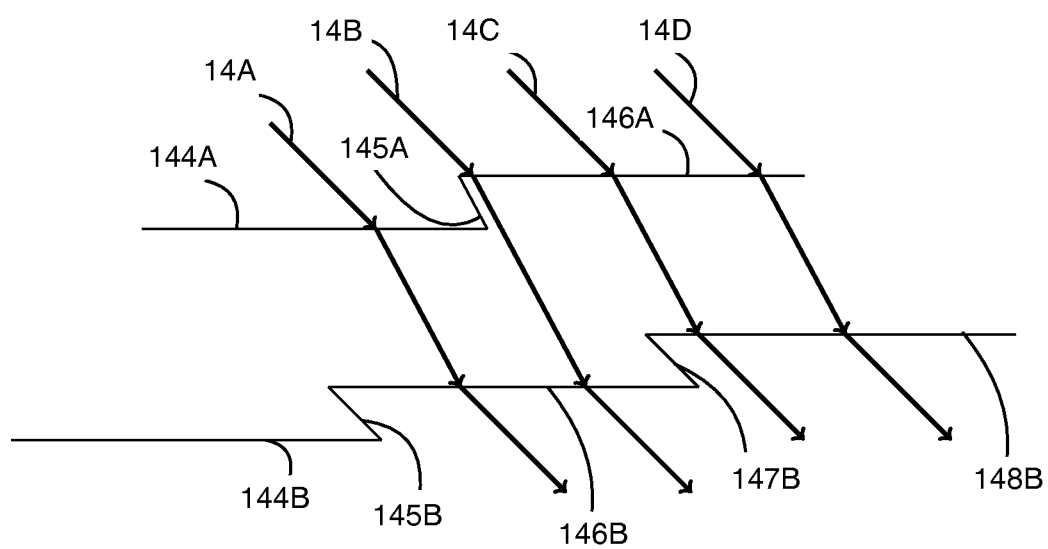

Illustrated in FIG. 14, in one embodiment, the intermediate surfaces 145A, 145B, 147B are at an oblique angle with respect to the normal direction of their neighboring principal surfaces 144A, 144B, 146A, 146B, 148B. The angle can generally be e.g. 1-60 degrees. This can be used to reduce the undesired reflections and/or refractions and/or to make them visually more tolerable.

Disruptions to the see-through property of staircase waveguides, as caused by the non-principal surfaces of the waveguides, in the form of unwanted reflections or absorptions are minor and/or can be reduced by design choices, such as slanted surface normals and the use of additional diffractive structures. If desired, these effects can furthermore be mitigated in the optimization process of the complete waveguide assembly.

In one embodiment, the effect of the non-principal surfaces 145A, 145B, 147B on the rays 14A-D passing through the waveguide is reduced by orienting the surfaces so that their normals are perpendicular to the mean propagation direction of the light rays passing from the environment through the waveguide into the eye. This configuration is illustrated specifically in FIG. 14. Changing the orientation of the non-principal surfaces does not, however, fundamentally remove their effect on the rays propagating inside the waveguide (like ray 13C in FIG. 13). This effect can, however, to some degree be compensated by the optimization procedure used to finalize the waveguide design, since these rays carry energy/intensity away from the image proper and are a source of ghost images, both of which are properties that usually lead to a decrease of the optimization merit function.

Benefits of the staircase geometry include that the waveguide geometry is not fundamentally affected by the geometry of the surface it has to follow and hence staircase waveguides can be realized for almost arbitrary outer surface geometries. Moreover, inter-ray angular relations inside the waveguide are not influenced by the outer surface geometry. Because of this, existing design modalities for the corresponding vanilla waveguides (those following their natural curvature) can be directly applied for the design of surface following staircase waveguides. Conventional spherical waveguides realizing specific focal plane distances can be converted into staircase waveguides.

One or more diffractive gratings may be provided on the staircase surface and/or outer surface of the waveguide. Most typically, such grating(s) is/are

- an in-coupling grating for coupling light rays directed thereto from outside of the waveguide element into the waveguide region thereof, and/or
- an out-coupling grating for coupling light rays travelling inside the waveguide region outside of the waveguide element, and/or
- an exit pupil expander grating for extending the exit pupil of light travelling within the waveguide region.

Depending on its purpose, the grating(s) may be fitted within the area of a single principal surface or they may overlap steps of the staircase, thus spanning over a several adjacent principal surfaces.

In typical embodiments applicable in particular for AR applications, the waveguide element is made from transparent material and adapted to allow light to pass the waveguide element essentially transversely to propagation direction of light in the waveguide.

A staircase waveguide stack may comprise two or more staircase waveguide elements as herein described placed on top of each other. The outer surfaces of the waveguides facing each other, whether consisting of the staircase surfaces (type A element) or separate surfaces (type B element), may be shaped so as to tightly fit against each other. Each individual waveguide in the stack may comprise one or more gratings, such as separate in-coupling gratings and/or out-coupling gratings for different wavelengths.

In some embodiments, each of the optical surfaces of each of the stacked elements has the same curvature and consequently the same focal plane. This allows for example for separation of colors of a single image between the elements.

In some embodiments, at least two of the stacked elements have principal surfaces with different curvatures, wherein each of the curvatures corresponds to a different focal plane. Thus, the stack has simultaneously many focal planes. This allows for presenting images at different apparent distances, to mention one useful application of this arrangement. Each of the at least two elements may be individually controlled or the same image may be projected to each of them.

In some embodiments, the stack comprises at least two elements having different waveguide curvatures and at least two elements having the same waveguide curvature. The stack may therefore serve different purposes simultaneously.

Figure 15:
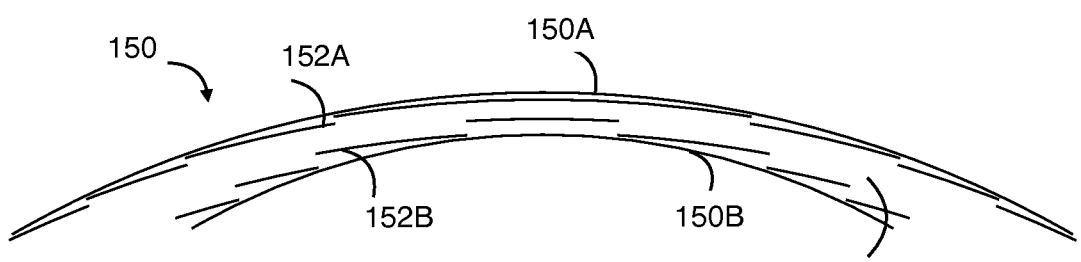
FIG. 15 shows in a cross-sectional view yet another variation of a staircase surface profile.

FIG. 15 shows a specific embodiment of "Type B" or "Type C" element, where the waveguide 150 comprises first and second outer surfaces 150A, 150B and wherein the principal surfaces 152A, 152B of the waveguide 152 are formed of internal hollows of vacuum or air, for example, inside a single material, preferably a unitary material layer. The hollows are positioned and shaped to provide a staircase profile for the waveguide 152 without intermediate surfaces at all. That is, they define a non-continuous optical surface for the waveguide region, where the intermediate surfaces do not appear explicitly. This is the case if the refractive index of the material between the waveguide region 152 and the vacuum/air surrounding the waveguide 150 matches the refractive index of the waveguide region 152 itself. For such staircase waveguides the staircase geometry itself does not introduce disturbances to the image of the environment as seen by the observer's eye. However, even though the non-principal surfaces are not explicitly present, their effect on rays propagating in the waveguide remains (some rays escape the waveguide) and thus warrant the same or similar considerations as discussed above in the case of staircase waveguides without explicit external surfaces.

Like discussed above in with reference to other embodiments, the principal surfaces 152A, 152B can be flat or non-flat, such as spherical, in this embodiment too. Likewise, the hollows can be replaced by low refractive index solid interface layers at the expense of the FOV of the element.

Figure 16:
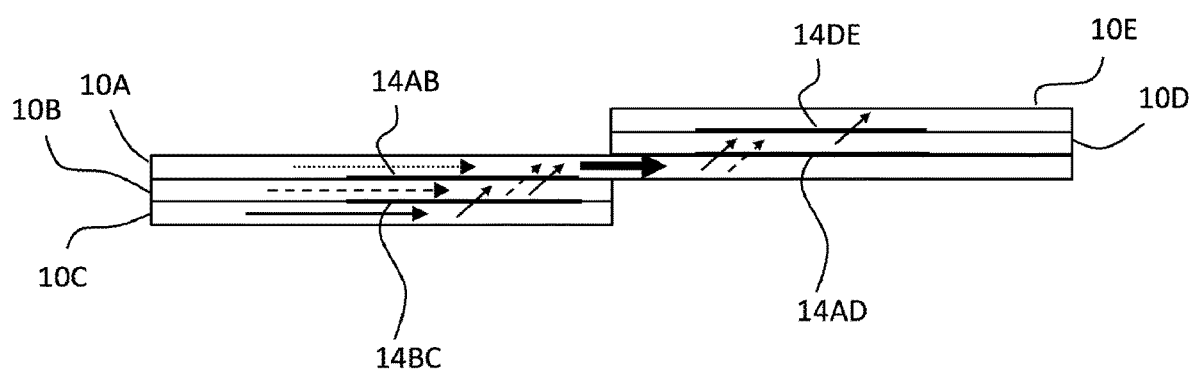
FIG. 16 shows a cross-sectional detail view of one stair of a multilayer-waveguide according to one embodiment of the invention.

Finally, FIG. 16 shows one possible implementation of the inner structure of the waveguide region. Instead of a single waveguide layer only, it comprises a plurality of layers 10A-E at least one of which continues as unbroken over the stair. On each side of the stair, there are several layers, herein three layers 10A, 10B, 10C/10A, 10D, 10E, respectively. Light is initially coupled to a plurality of first side layers 10A, 10B, 10C. Upstream of the stair, there is provide at least one diffractive optical element 14AB, 14BC, which is adapted to change the power distribution of light between the layers 10A, 10B, 10C so that light is "packed" to the continuous layer 10A before the stair. In that layer, all power is transferred to the second side of the stair. Thus, the light "climbs" the stair conveniently. On the second side, the light power may again redistributed between the layers 10A, 10D, 10E using intermediate diffractive optical elements 14AD, 14DE.

In all embodiments, the material of the waveguide region can be a high-refractive index glass having an index of refraction (n) of 2.0, or more. Alternatively, it may be formed from by a high-refractive index (n≥1.7) plastic. In type B and type C embodiments comprising a lower refractive index interface layer and/or a separate outer-surface forming layer on the waveguide region, this layer can be formed e.g. of plastic with n≤1.4, such as n≤1.3.

In all of the embodiments discussed, the grating or gratings, or more generally diffractive optical elements (DOEs), contained in the waveguide can be located on or between the principal surfaces, irrespective of whether the principal surfaces are outer surfaces or internal optical interfaces, including hollows, in the element. In a typical embodiment, the grating or gratings is/are located on at least principal surface of the waveguide. The grating(s) may or may not penetrate into the next layer, which may be an air or vacuum hollow layer or a solid low refraction index layer, depending on the type of the element.

The grating material can be for example an oxide or nitride, such as a metal oxide, for example $TiO_2$.

The grating or gratings may extend over a single or over several stairs. In one embodiment, an output grating is extended on the region of at least two stairs so as to provide a display element that is leaky towards at least one side thereof. This way, non-flat display elements with low optical distortion can be implemented.

CITATIONS LIST

Patent Literature

U.S. Pat. No. 8,830,584 B2

Non-Patent Literature

P. Saarikko, J. Opt. A: Pure Appl. Opt. 11 (2009), 065504

The invention claimed is:

1. A diffractive waveguide element, the waveguide element comprising:
   a waveguide region having a generally curved shape defined by two optical surfaces between which light can propagate by total internal reflections, the two optical surfaces having a concave optical surface with a first staircase profile and a convex optical surface with a second staircase profile, the first staircase profile and second staircase profile each having discrete steps that define the generally curved shape of the waveguide region, and
   at least one diffractive optical element capable of modifying the light field within the waveguide region via diffraction.

2. The waveguide element according to claim 1, wherein the generally curved shape is a spherical or aspherical shape.

3. The waveguide element according to claim 1, wherein the first and second staircase profiles each comprises a plurality of principal surfaces at which said total internal reflections occur and intermediate surfaces between the principal surfaces.

4. The waveguide element according to claim 3, wherein at least some of the principal surfaces are planar.

5. The waveguide element according to claim 3, wherein at least some of the principal surfaces are curved as spherical or aspherical.

6. The waveguide element according to claim 5, wherein the waveguide region has the generally curved shape and the principal surfaces have curvature in the opposite direction than the curvature of said generally curved shape.

7. The waveguide element according to claim 5, wherein the waveguide region has the generally curved shape and the principal surfaces have curvature in the same direction as the curvature of said generally curved shape.

8. The waveguide element according to claim 3, wherein at least some of the intermediate surfaces have a lower transmittance than the principal surfaces.

9. The waveguide element according to claim 3, wherein the intermediate surfaces are at essentially right angles with respect to the neighboring principal surfaces.

10. The waveguide element according to claim 3, wherein at least most of the intermediate surfaces are at slanted angles with respect to the neighboring principal surfaces.

11. The waveguide element according to claim 3, wherein the principal surfaces are shaped as parts of a continuous surface as a spherical surface or lens surface having a focal distance.

12. The waveguide element according to claim 3, wherein the intermediate surfaces are parallel to each other.

13. The waveguide element according to claim 1, wherein the waveguide element has an outer surface and the optical surface(s) having said staircase profile forms at least part of said outer surface.

14. The waveguide element according to claim 1, wherein the waveguide element has an outer surface having a continuous surface profile, and the two optical surfaces having said first and second staircase profiles are at least partly separated from said outer surface by a layer of material.

15. The waveguide element according to claim 14, wherein said two optical surfaces defining the waveguide region are formed by hollows in said material, the hollows defining principal surfaces of the staircase profile.

16. The waveguide element according to claim 15, wherein said layer of material has the same refractive index as the waveguide region.

17. The waveguide element according to claim 1, wherein the at least one diffractive optical element comprises:
   an in-coupling grating for coupling light rays directed thereto from outside of the waveguide region into the waveguide region, and/or
   an out-coupling grating for coupling light rays travelling inside the waveguide region outside of the waveguide, and/or
   an exit pupil expander grating for extending the exit pupil of light travelling within the waveguide region.

18. The waveguide element according to claim 1, wherein the diffractive optical element is arranged on said optical surface or in the waveguide region.

19. The waveguide element according to claim 1, wherein the waveguide element is made from transparent material and adapted to allow light to pass the waveguide element essentially transversely to propagation direction of light in the waveguide region.

20. The waveguide element according to claim 1, wherein the waveguide region comprises a plurality of waveguide layers at least one of which extends as a continuous layer over at least one stair of at least one of the first or second staircase profiles, and there is provided at least one intermediate diffractive optical element between said layers for changing propagating light power distribution between said layers.

21. A waveguide stack comprising a plurality of waveguide elements according to claim 1, superimposed on top of each other.

22. The stack according to claim 21, wherein:
   optical surfaces of at least two of the elements have different curvatures, and
   each of the curvatures corresponds to a different focal plane.

23. A personal display device comprising:
   the waveguide element according to claim 1, and
   an image projector adapted to project an image to the waveguide element or waveguide stack for propagation with the waveguide region.

24. The personal display device according to claim 23, comprising at least two diffractive gratings, one of which is an in-coupling grating positioned at a first region of the waveguide element, and one of which is an out-coupling grating positioned at a second region of the waveguide element, wherein:
   the image projector is adapted to project the image on the in-coupling grating for coupling to the waveguide region, and
   the out-coupling grating is adapted to couple the image out of the waveguide region to a viewer's eye at a distance from the waveguide element.

25. The personal display device according to claim 23, wherein the waveguide element is shaped as a curved corrective or non-corrective lens or placed on top of a curved corrective or non-corrective lens following its shape.

26. The personal display device according to claim 23, wherein the waveguide element or waveguide stack is provided in a spectacle form factor.

27. A method of forming a viewable image in a near-to-the-eye display, comprising:
- providing a waveguide element or waveguide stack according to claim 1,
- projecting an image to an in-coupling grating arranged on a first region of the waveguide element or waveguide stack,
- allowing light to propagate inside the waveguide region or region along the staircase profile, and
- coupling light out of the waveguide by an out-coupling grating arranged on a second region of the waveguide element or waveguide stack.

* * * * *